(12) United States Patent  (10) Patent No.: US 8,573,536 B2
McGeer et al.  (45) Date of Patent: Nov. 5, 2013

(54) METHOD AND APPARATUS FOR AUTOMATED LAUNCH, RETRIEVAL, AND SERVICING OF A HOVERING AIRCRAFT

(75) Inventors: Brian Theodore McGeer, Underwood, WA (US); Robert Joseph Heavey, White Salmon, WA (US); Damon Lucas McMillan, White Salmon, WA (US); John William Stafford, Lyle, WA (US)

(73) Assignee: Aerovel Corporation, White Salmon, WA (US)

( * ) Notice: Subject to any disclaimer, the term of this patent is extended or adjusted under 35 U.S.C. 154(b) by 384 days.

(21) Appl. No.: 13/037,436

(22) Filed: Mar. 1, 2011

(65) Prior Publication Data

US 2011/0233329 A1    Sep. 29, 2011

Related U.S. Application Data

(60) Provisional application No. 61/317,803, filed on Mar. 26, 2010.

(51) Int. Cl.
    *B64F 1/02*    (2006.01)
    *B64F 1/04*    (2006.01)
(52) U.S. Cl.
    USPC .... 244/110 C; 244/63; 244/110 F; 244/114 R
(58) Field of Classification Search
    USPC ............. 244/63, 110 C, 110 F, 110 G, 114 R
    See application file for complete search history.

(56) References Cited

U.S. PATENT DOCUMENTS

| 968,339 A * | 8/1910 | Geraldson ...................... 244/63 |
| 1,144,505 A | 6/1915 | Steffan |

(Continued)

FOREIGN PATENT DOCUMENTS

| CA | 781808 | 4/1968 |
| CA | 839101 | 4/1970 |
| EP | 0472613 | 4/1992 |
| WO | WO 2008/015663 | 2/2008 |

OTHER PUBLICATIONS

Examiner's First Report for Australian Patent Application No. 2007347147, dated Oct. 26, 2011 (2 pages).

(Continued)

*Primary Examiner* — Joseph W Sanderson
(74) *Attorney, Agent, or Firm* — Neal, Gerber & Eisengberg LLP

(57) ABSTRACT

An aircraft capable of thrust-borne flight can be automatically retrieved, serviced, and launched using equipment suitable for use on a small vessel, or at a base with similarly limited space or irregular motion. For retrieval, the aircraft drops a tether, and pulls the tether at low relative speed into contact with a horizontal guide. The tether is pulled across the guide until the guide is captured by a hook or other end effector. The tether length is then adjusted as necessary, and the aircraft swings on the guide to hang in an inverted position. Translation of the tether along the guide then brings the aircraft to a docking carriage, in which the aircraft parks for servicing. For launch the carriage is swung upright, the end effector is released from the guide, and the aircraft thrusts into free flight. A full ground-handling cycle can thus be accomplished automatically with simple and economical apparatus. It can be used with low risk of damage, and requires only moderate accuracy in manual or automatic flight control.

30 Claims, 21 Drawing Sheets

(56) References Cited

U.S. PATENT DOCUMENTS

| | | | |
|---|---|---|---|
| 1,383,595 A | 7/1921 | Black | |
| 1,499,472 A | 7/1924 | Pratt | |
| 1,716,670 A | 6/1929 | Sperry | |
| 1,731,091 A | 10/1929 | Belleville | |
| 1,748,663 A | 2/1930 | Tucker | |
| 1,836,010 A | 12/1931 | Audrain | |
| 2,435,197 A | 2/1948 | Brodie | |
| 2,448,209 A | 8/1948 | Boyer et al. | |
| 2,488,050 A | 11/1949 | Brodie | |
| 2,552,115 A | 5/1951 | Replogle | |
| 3,980,259 A | 9/1976 | Greenhalgh et al. | |
| 4,123,020 A | 10/1978 | Korsak | |
| 4,147,317 A | 4/1979 | Mayhew et al. | |
| 4,311,290 A | 1/1982 | Koper | |
| 4,680,962 A | 7/1987 | Durbin | |
| 4,753,400 A | 6/1988 | Reuter et al. | |
| 4,790,497 A | 12/1988 | Yoffe | |
| 4,842,222 A | 6/1989 | Baird | |
| 5,039,034 A | 8/1991 | Burgess et al. | |
| 5,042,750 A | 8/1991 | Winter | |
| 5,054,717 A | 10/1991 | Taylor | |
| 5,092,540 A | 3/1992 | Burgess et al. | |
| 5,687,930 A | 11/1997 | Wagner et al. | |
| 5,799,900 A | 9/1998 | McDonnell | |
| 6,264,140 B1 | 7/2001 | McGeer et al. | |
| 6,824,102 B2 | 11/2004 | Haggard | |
| 6,874,729 B1 | 4/2005 | McDonnell | |
| 6,961,018 B2 | 11/2005 | Heppe et al. | |
| 7,066,430 B2 | 6/2006 | Dennis et al. | |
| 7,097,137 B2 | 8/2006 | McDonnell | |
| 7,104,495 B2 | 9/2006 | McGeer | |
| 7,121,507 B2 | 10/2006 | Dennis et al. | |
| 7,140,575 B2 | 11/2006 | McGeer et al. | |
| 7,143,974 B2 | 12/2006 | Roeseler et al. | |
| 7,143,976 B2 | 12/2006 | Snediker et al. | |
| 7,152,827 B2 | 12/2006 | McGeer | |
| 7,165,745 B2 | 1/2007 | McGeer et al. | |
| 7,175,135 B2 | 2/2007 | Dennis et al. | |
| 7,219,856 B2 | 5/2007 | Watts et al. | |
| 7,264,204 B1 | 9/2007 | Portmann | |
| 7,360,741 B2 | 4/2008 | McGeer et al. | |
| 7,410,125 B2 | 8/2008 | Steele | |
| 7,510,145 B2 | 3/2009 | Snediker | |
| 7,712,702 B2 | 5/2010 | McGeer et al. | |
| 7,954,758 B2 | 6/2011 | McGeer et al. | |
| 8,245,968 B2 | 8/2012 | McGeer et al. | |
| 8,276,844 B2 * | 10/2012 | Kariv | 244/110 C |
| 8,348,193 B2 | 1/2013 | McGeer et al. | |
| 2002/0100838 A1 | 8/2002 | McGeer et al. | |
| 2003/0222173 A1 | 12/2003 | McGeer et al. | |
| 2004/0256519 A1 | 12/2004 | Ellis et al. | |
| 2005/0133665 A1 | 6/2005 | Dennis et al. | |
| 2005/0151014 A1 | 7/2005 | McGeer | |
| 2005/0178894 A1 | 8/2005 | McGeer et al. | |
| 2005/0178895 A1 | 8/2005 | McGeer et al. | |
| 2005/0189450 A1 | 9/2005 | Roeseler et al. | |
| 2005/0230536 A1 | 10/2005 | Dennis et al. | |
| 2006/0065780 A1 | 3/2006 | Rednikov | |
| 2006/0102783 A1 | 5/2006 | Dennis et al. | |
| 2006/0175463 A1 | 8/2006 | McGeer | |
| 2006/0175466 A1 | 8/2006 | Snediker et al. | |
| 2006/0249623 A1 | 11/2006 | Steele | |
| 2007/0051849 A1 | 3/2007 | Watts et al. | |
| 2007/0075185 A1 | 4/2007 | McGeer et al. | |
| 2007/0158498 A1 | 7/2007 | Snediker | |
| 2007/0252034 A1 | 11/2007 | McGeer et al. | |
| 2008/0156932 A1 | 7/2008 | McGeer et al. | |
| 2009/0224097 A1 | 9/2009 | Kariv | |
| 2011/0024559 A1 * | 2/2011 | McGeer et al. | 244/110 F |
| 2011/0133024 A1 | 6/2011 | McGeer et al. | |
| 2011/0233329 A1 * | 9/2011 | McGeer et al. | 244/110 F |

OTHER PUBLICATIONS

Flexrotor Long-Endurance VTOL Aircraft Transitions to Wing-Borne Flight, available at http://www.aerovelco.com/papers/FlexrotorTransitionsAnnouncement.pdf, dated Aug. 4, 2011 (2 pages).

European Search Report for European Patent Application No. 10250229.1, dated Jan. 21, 2013 (5 pages).

A miniature powerplant for very small, very long range autonomous aircraft, S.P. Hendrickson and T. McGeer, Final Report under U.S. DoE contract No. DE-FG03-96ER82187, Sep. 29, 1999 (25 pages).

Aerosonde hazard estimation, T. McGeer, 1994 (7 pages).

Aerosonde Pacific reconnaissance: ready when you are!, T. McGeer, Pacific Northwest Weather Workshop, Mar. 2005 (15 pages).

An Airspeed Vector Sensor for V/STOL Aircraft, E. Durbin and T. McGeer, Journal of Aircraft, vol. 19, No. 6, Jun. 1982 (7 pages).

Autonomous Aerosondes for Economical Atmospheric Soundings Anywhere on the Globe, G.J. Holland, T. McGeer and H.H. Youngren, Bulletin of the American Meteorological Society, vol. 73, No. 12, Dec. 1992 (12 pages).

Automated Launch, Recovery, and Refueling for Small Unmanned Aerial Vehicles, K. Mullens, et al., 2004 (11 pages).

International Search Report (PCT/US2007/076276), dated Sep. 22, 2008 (7 pages).

Laima: The First Atlantic Crossing by Unmanned Aircraft, T. McGeer, Feb. 25, 1999 (25 pages).

Quantitative Risk Management as a Regulatory Approach to Civil UAVs, T. McGeer, L. Newcombe, and J. Vagners, International Workshop on UAV Certification, Jun. 4, 1999 (11 pages).

Regulatory Issues Involving Long-Range Weather Observation by Aerosonde Autonomous Aircraft, T. McGeer, Oct. 9, 1998 (8 pages).

Safety, Economy, Reliability and Regulatory Policy for Unmanned Aircraft, T. McGeer, Mar. 2007 (9 pages).

The Beartrap—A Canadian Invention, Crowsnest Magazine, vol. 17, No. 3 and 4 [online], Mar.-Apr. 1965, [retrieved on Sep. 14, 2007]. Retrieved from the Internet at <URL: http://www.readyayeready.com/timeline/1960s/beartrap/index.htm> (4 pages).

Wide-Scale Use of Long-Range Miniature Aerosondes Over the World's Oceans, T. McGeer and J. Vagners, 1999 (25 pages).

Written Opinion (PCT/US2007/076276), dated Mar. 5, 2009 (6 pages).

European Search Report for European Patent Application No. 11159710.0, dated Aug. 2, 2013 (7 pages).

* cited by examiner

METHOD AND APPARATUS FOR AUTOMATED LAUNCH, RETRIEVAL, AND SERVICING OF A HOVERING AIRCRAFT

PRIORITY CLAIM

This patent application is a non-provisional patent application of, and claims priority to and the benefit of, U.S. Provisional Patent Application Ser. No. 61/317,803, filed Mar. 26, 2010, the entire contents of which are incorporated herein by reference.

CROSS REFERENCE TO RELATED APPLICATIONS

The present application relates to the following commonly-owned pending patent applications: U.S. patent application Ser. No. 11/837,878, filed on Aug. 13, 2007, U.S. patent application Ser. No. 12/702,935, filed on Feb. 9, 2010, and U.S. patent application Ser. No. 13/024,843, filed on Feb. 10, 2011.

BACKGROUND

1. Field of Invention

The present invention addresses launch, retrieval, and servicing of a hovering aircraft, especially in turbulent winds or onto an irregularly-moving platform, such as a ship in a rough sea. The invention is especially suited to unmanned aircraft of small size. It allows for a fully automated operations cycle, whereby the aircraft can be repeatedly launched, retrieved, serviced, and re-launched, without manual intervention at any point, and while requiring only modest accuracy in piloting.

2. Description of Prior Art

Hovering aircraft, be they helicopters, thrust-vectoring jets, "tail-sitters", or other types, usually land by gently descending in free thrust-borne flight onto a landing surface, coming to rest on an undercarriage of wheels, skids, or legs. This elementary technique can be problematic in certain situations, as for example when targeting a small, windswept landing pad on a ship moving in a rough sea. The well-known Beartrap or RAST (Stewart & Baekken 1968) as well as the harpoon-and-grid system (Wolters & Reimering 1994) are used to permit retrieval with acceptable safety in such conditions. These systems require an expensive and substantial plant in the landing area, as well as manual operations coordinated between helicopter and shipboard crew. Furthermore the helicopter must carry a complete undercarriage in addition to the components necessary for capturing the retrieval apparatus.

Desirable improvements relative to such existing systems include (a) simplification of apparatus, and (b) automated rather than manual operation. Ideally automation would encompass not only retrieval but also subsequent refueling and launch. This would be particularly desirable for an unmanned aircraft, whose operations cycle could then be made fully autonomous. Some experimental work toward this objective has been done for a hovering aircraft by Mullens, et al. (2004), but with limited success even with light wind and a stationary base. The present invention by contrast provides for fully automated operation in calm or rough conditions, using apparatus which is simple, portable, and suitable for a small vessel or similarly confined base.

SUMMARY

In one embodiment of the present invention, an aircraft would proceed automatically from free thrust-borne flight through retrieval, servicing, and subsequent launch through the following sequence of actions.

a. While approaching base at low relative speed in substantially thrust-borne flight, the aircraft drops a tension element such as a tether or cable, which is typically attached to the aircraft at a point below the aircraft's mass centre.

b. The aircraft then brings the tether into contact with a guide element such as a crossbar or cable, whose principal dimension extends horizontally or substantially horizontally across the approach path of the aircraft and tether.

c. The tether is then drawn across the guide until the tether becomes attached to the guide or a fixture thereon, for example by a hook on the end of the tether. The aircraft may then adjust the tether length, or the position of the tether along the guide, while remaining attached to the guide.

d. The aircraft then swings around the guide into an inverted position, such that its mass centre is below the guide.

e. The aircraft then shortens the tether, and translates along the guide into a docking carriage. Precise positioning in the docking carriage may be aided by aligning surfaces or by adjustments in tether length.

f. As a consequence of insertion into the docking carriage, or as a subsequent step, the aircraft may connect to refueling or other services in the base station. The aircraft's powerplant may also be shut down.

g. At some point the docking carriage is swung upright, so that the thrust line of the aircraft is pointed upward or approximately upward.

h. The aircraft is refueled and otherwise serviced as necessary through one or more servicing connectors.

i. The tether is disconnected from the guide.

j. The aircraft powerplant may be restarted, and launch preparations completed. The aircraft may then use its own thrust to pull itself out of the docking carriage into thrust-borne free flight, or it may be forcibly ejected.

Since loads can be low during retrieval from hover, the apparatus can be light and portable. Furthermore, easy targeting makes the technique well-suited for both manual control and economical automation.

Additional features and advantages are described herein, and will be apparent from the following Detailed Description and the figures.

a. contacting a horizontal guide with a tether, the guide in this case taking the form of a cylindrical beam;

b. capturing the guide;

c. swinging around the guide into an inverted position;

d. entering a docking carriage;

e. swinging in the docking carriage back to an upright position;

f. starting its engine, and releasing its hook from the guide; and g. launching into free flight.

Figure 2:
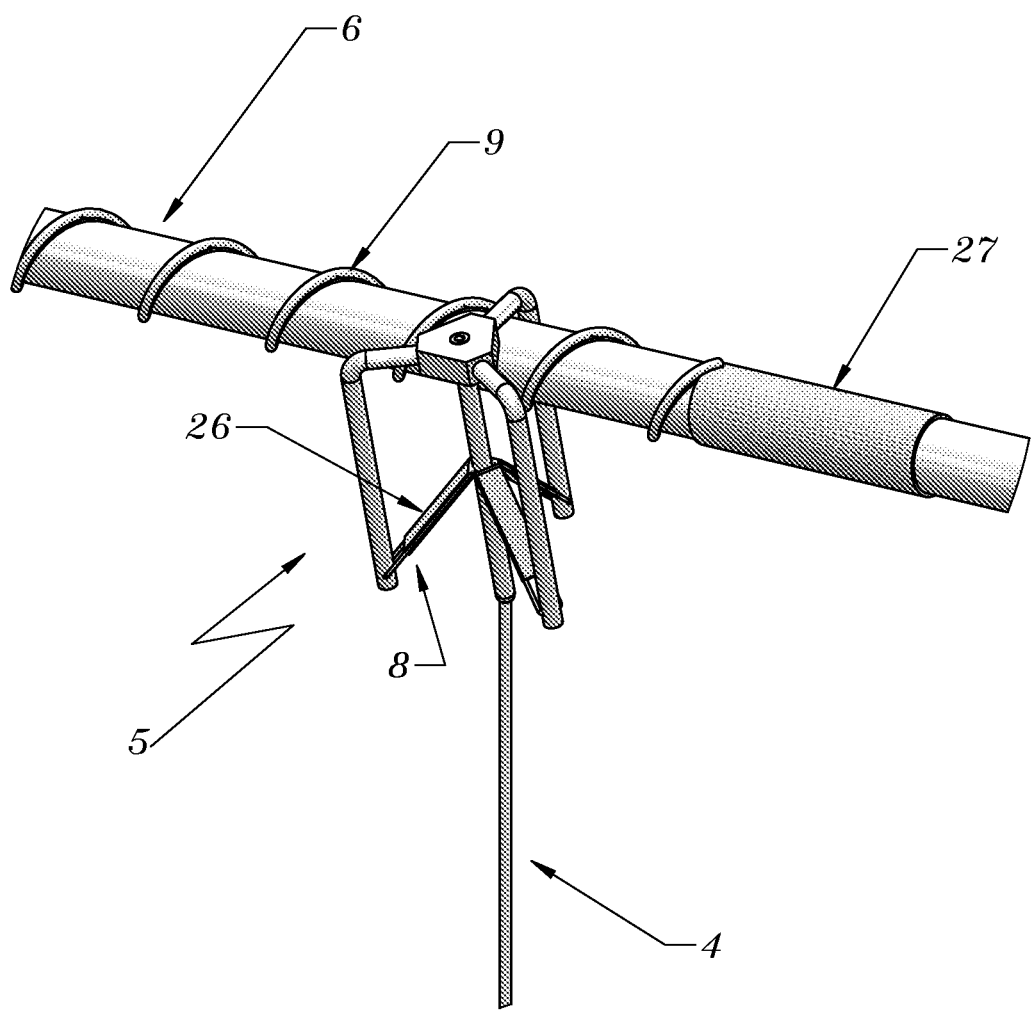

FIG. 2 is a perspective view of one embodiment of a hook used to attach the tether to a horizontal guide beam or cable.

Figure 3:
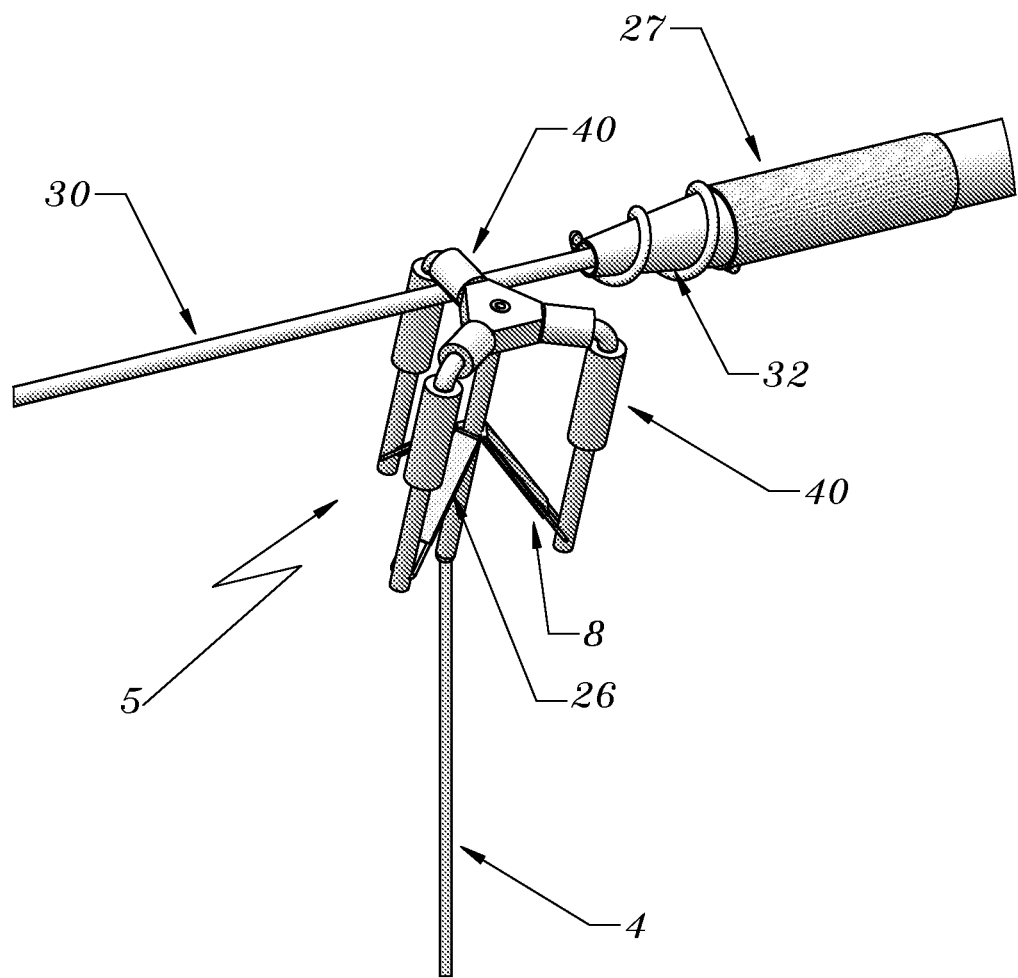

FIG. 3 is a perspective view of another embodiment of a hook which incorporates rolling elements to enable translation with low friction along a horizontal guide.

Figure 4A:
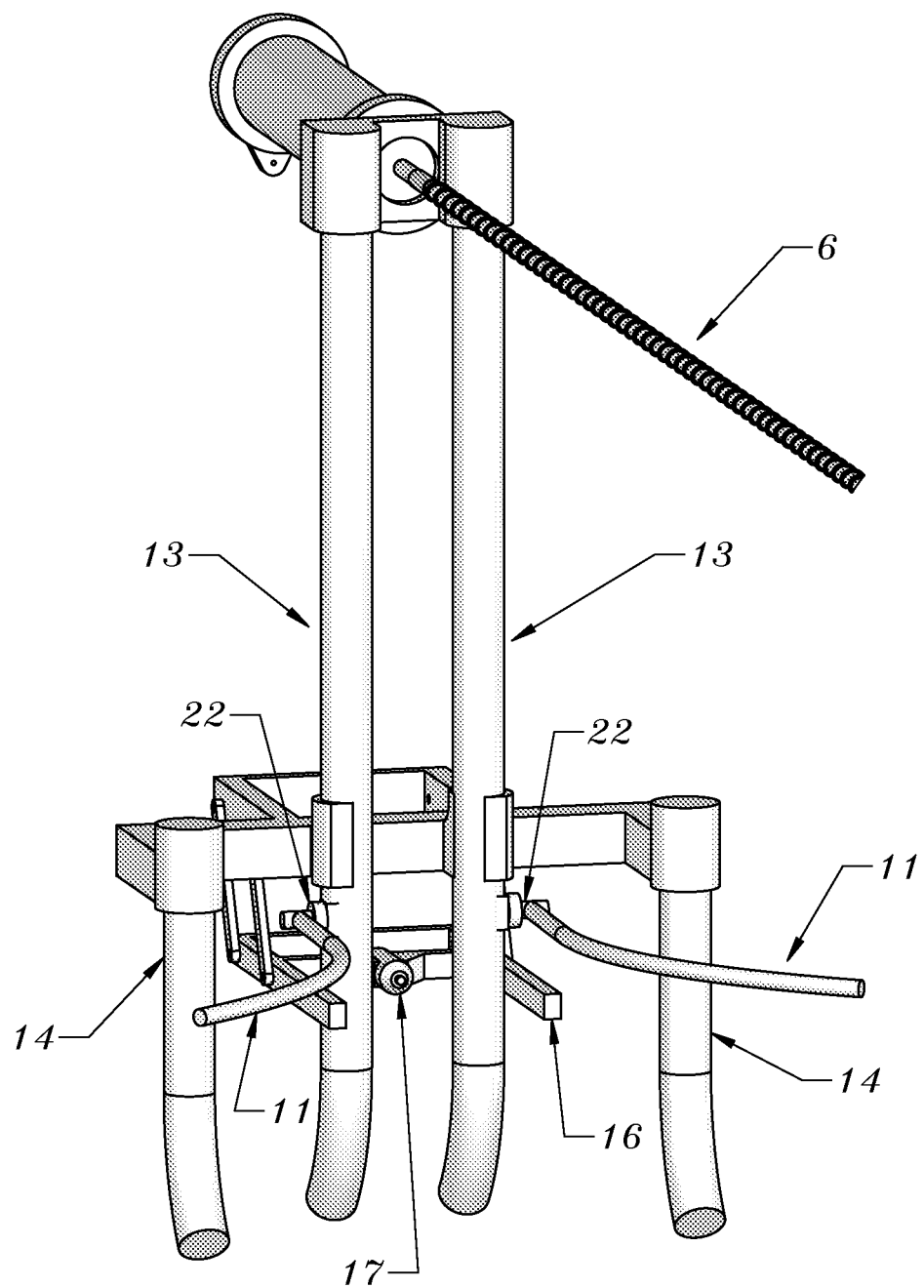

FIG. 4 is a series of perspective views of a representative docking carriage, showing:
  a. the carriage by itself;
  b. an aircraft entering the carriage; and
  c. the carriage and aircraft swinging around the horizontal guide.

Figure 5A:
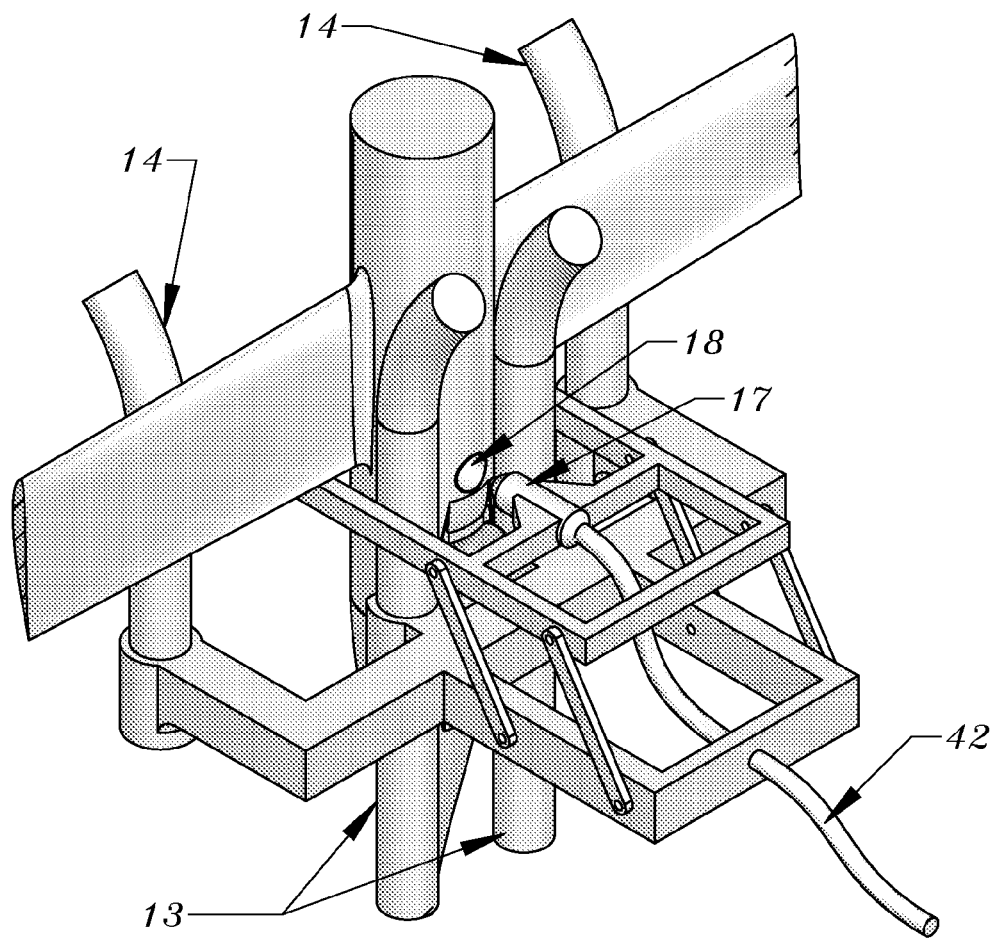
Figure 5B:
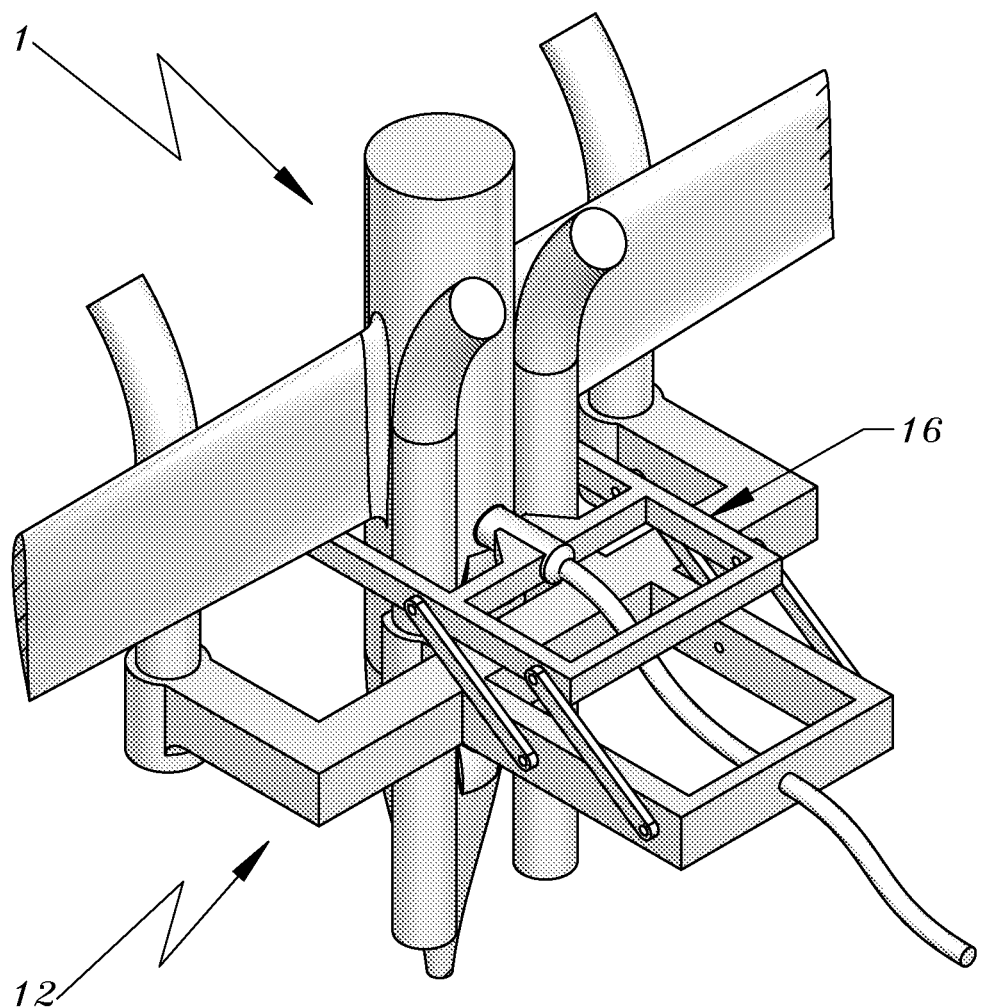

FIG. 5 is a pair of perspective views of a representative fueling connection, showing the connection when (a) open; and (b) mated.

FIG. 6 is a series of perspective views showing one mechanism for releasing the hook of FIG. 2 from a cylindrical horizontal guide.

Figure 7:
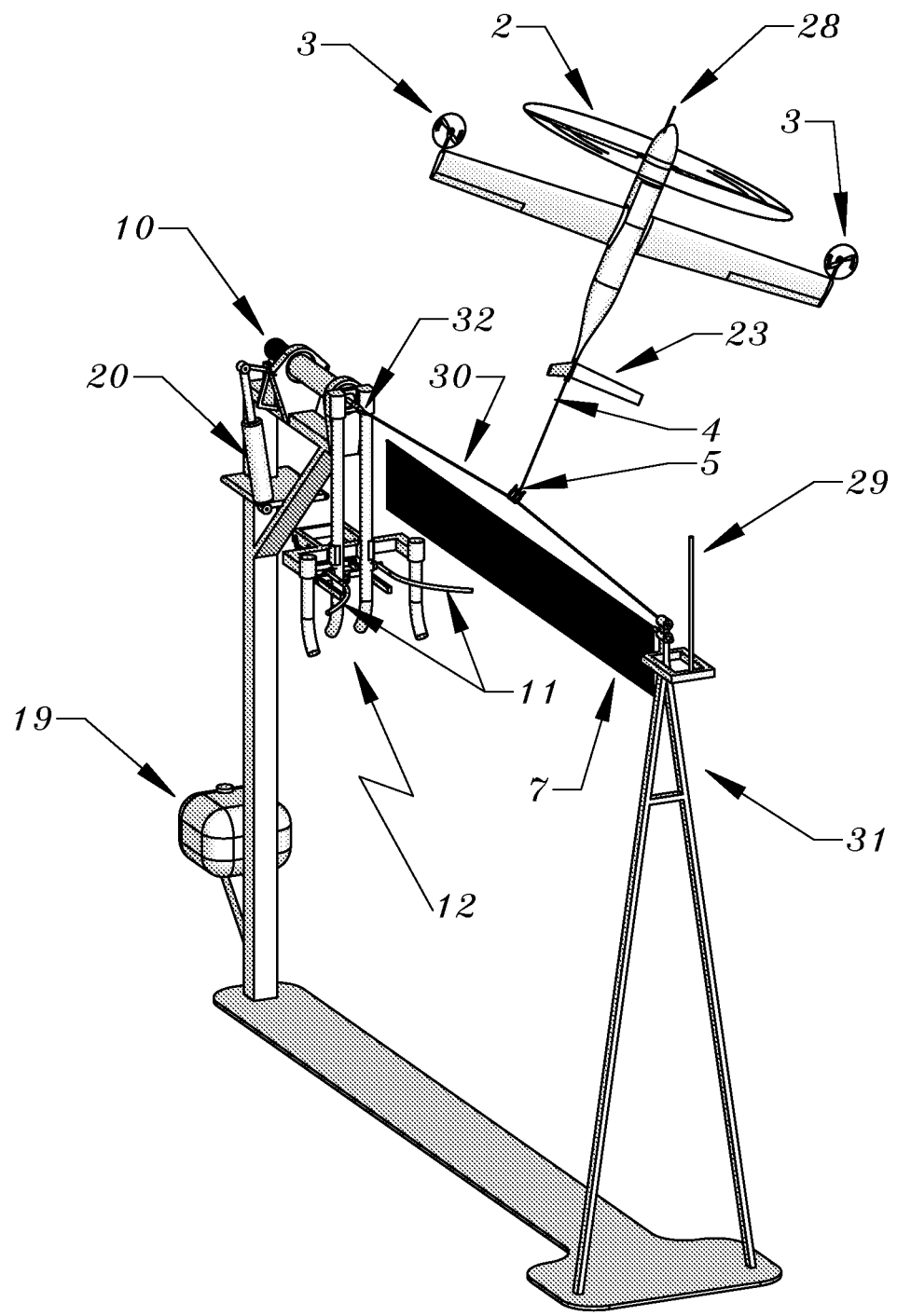

FIG. 7 is a perspective view of an embodiment of the base station, in which the horizontal guide is a cable.

Figure 8:
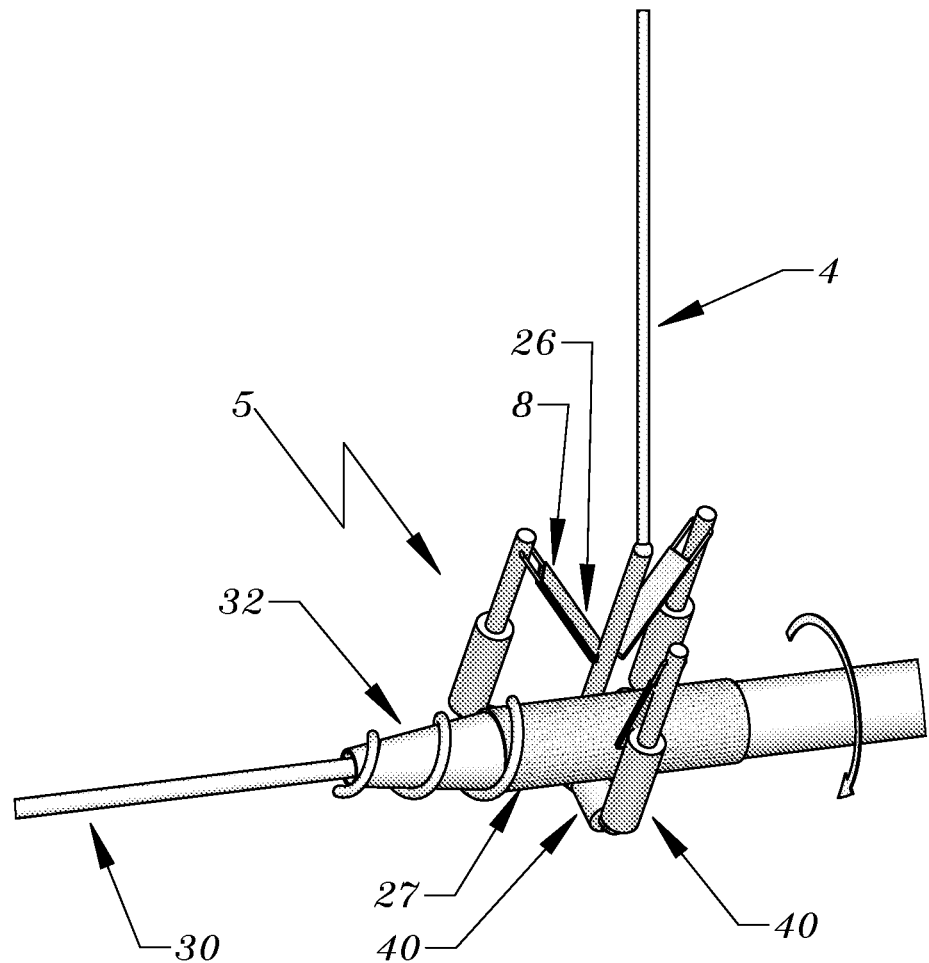

FIG. 8 is a perspective view of one mechanism for releasing the hook of FIG. 3 from a cable guide as in FIG. 7.

Figure 9:
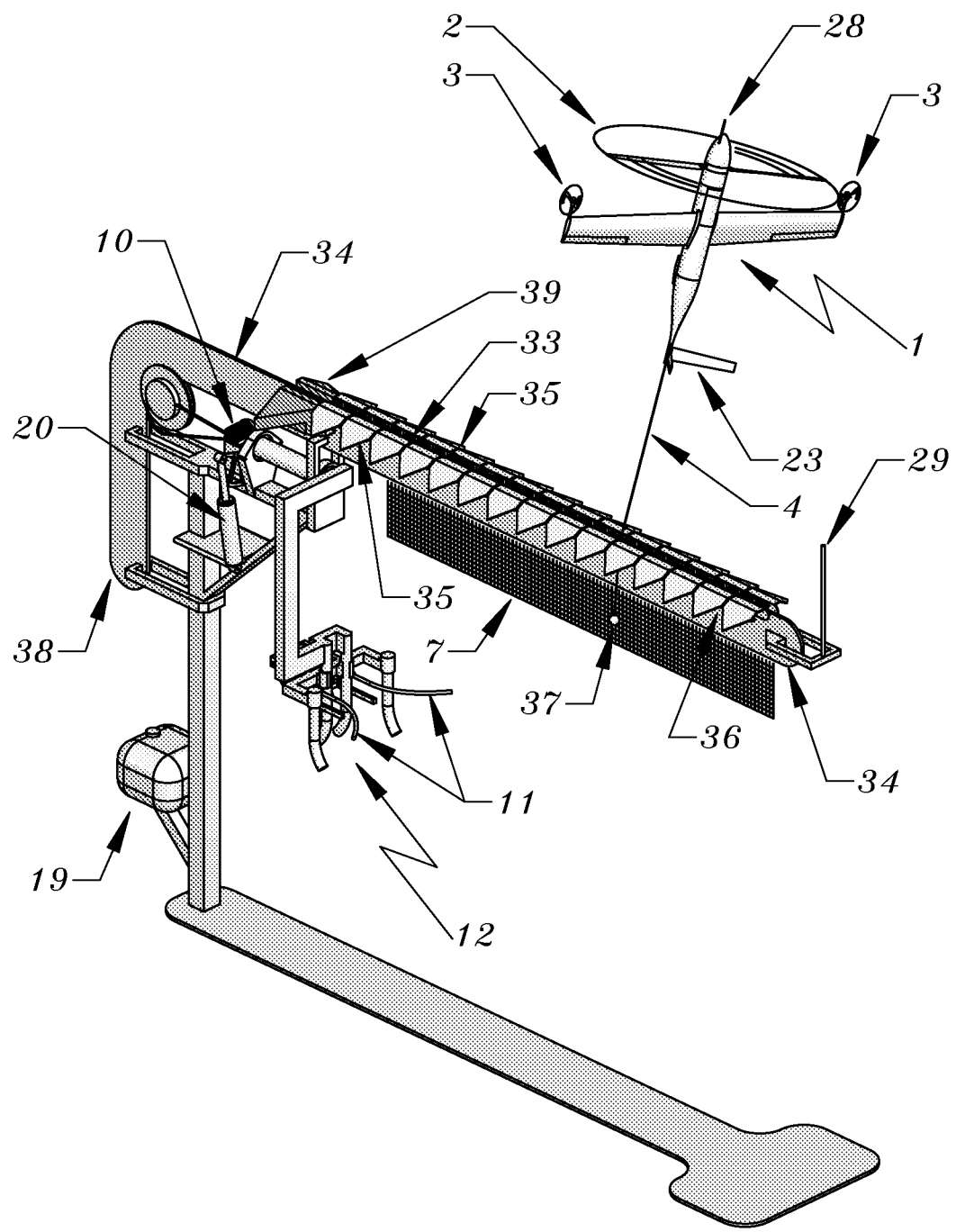

FIG. 9 is a diagrammatic perspective of an embodiment of the base station, in which the horizontal guide takes the form of a chain which runs on a bar, and in which the chain is captured by the aircraft using a ball on the end of the tether.

Figure 10:
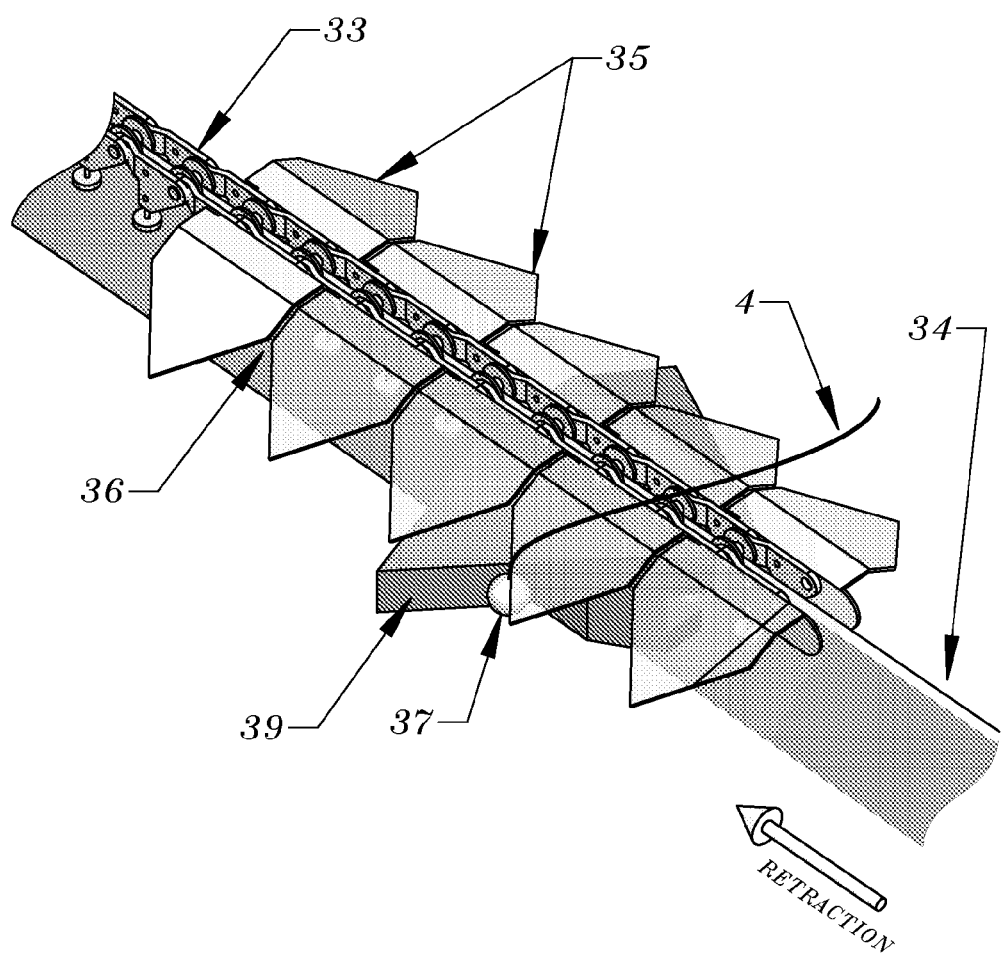

FIG. 10 is a diagrammatic perspective view showing one mechanism for releasing the ball of FIG. 9 from the chain.

DETAILED DESCRIPTION

FIG. 1 shows an illustrative embodiment of the present invention, as used with a "tailsitter" or "tilt-body" aircraft which adopts a nose-vertical orientation for thrust-borne flight. For thrust, in this example, aircraft 1 uses a main rotor 2, and for attitude control it applies a combination of variable blade pitch on the main rotor with variable power on wing-tip thrusters 3.

Figure 1A:
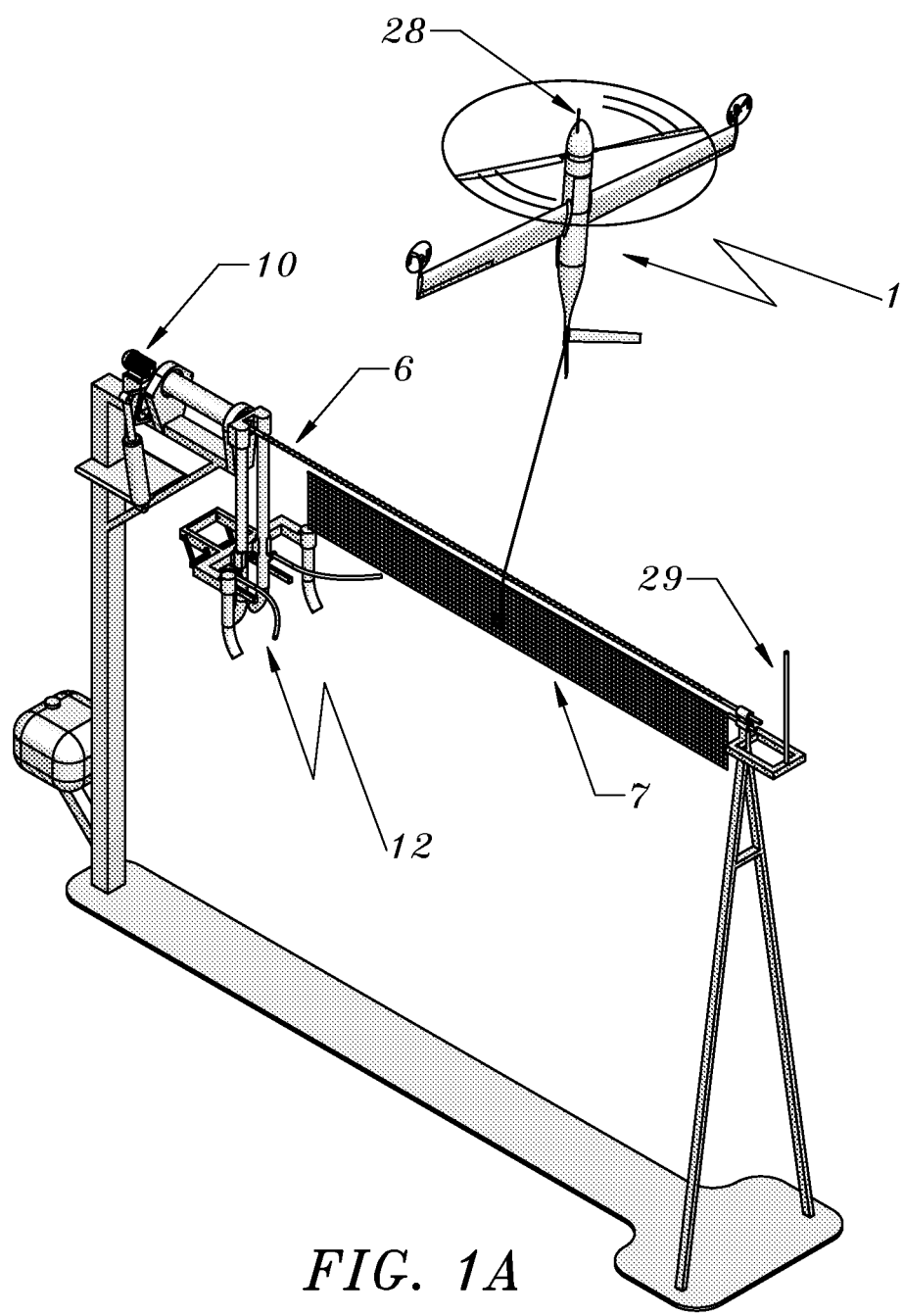
FIG. 1 is a series of perspective views of an embodiment of the present invention for a hovering "tail-sitter" aircraft, showing the aircraft sequentially.
Figure 1B:
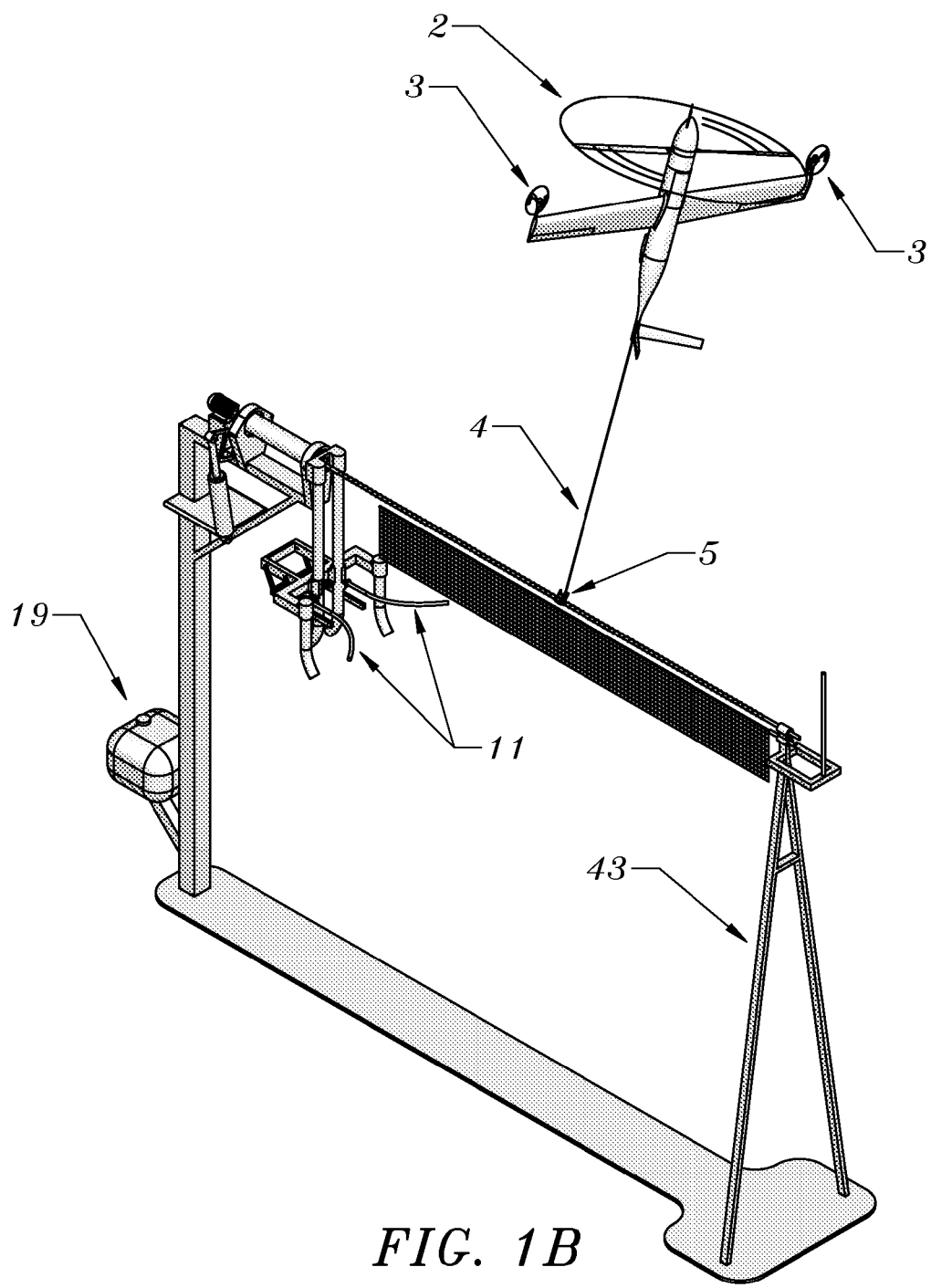

In preparation for retrieval, the aircraft uses an onboard winch to extend a tension element such as a lightweight tether 4 having an effector or end fitting 5, which in this embodiment takes the form of a hook as shown in FIG. 2. The aircraft approaches a horizontal guide comprising a crossbar 6 along an approximately horizontal path at low relative speed. This brings the tether into contact with the crossbar as shown in FIG. 1(a). In one embodiment a screen 7 or other suitable fixture may be suspended below the crossbar to damp pendulous oscillations of the tether, which would otherwise cause contact with the crossbar to be intermittent. After contact is made, the aircraft can draw the hook 5 against the crossbar by some combination of (1) continued translation along the approach path; (2) climb; or (3) retraction of the tether. The crossbar is thereby pulled through the gate 8 of the hook as shown in FIG. 2, and the crossbar is then captured by the aircraft as shown in FIG. 1(b).

Note, however, that if the hook fails to capture the crossbar then the aircraft will continue unimpeded in thrust-borne free flight, and can return for another approach.

Figure 1C:
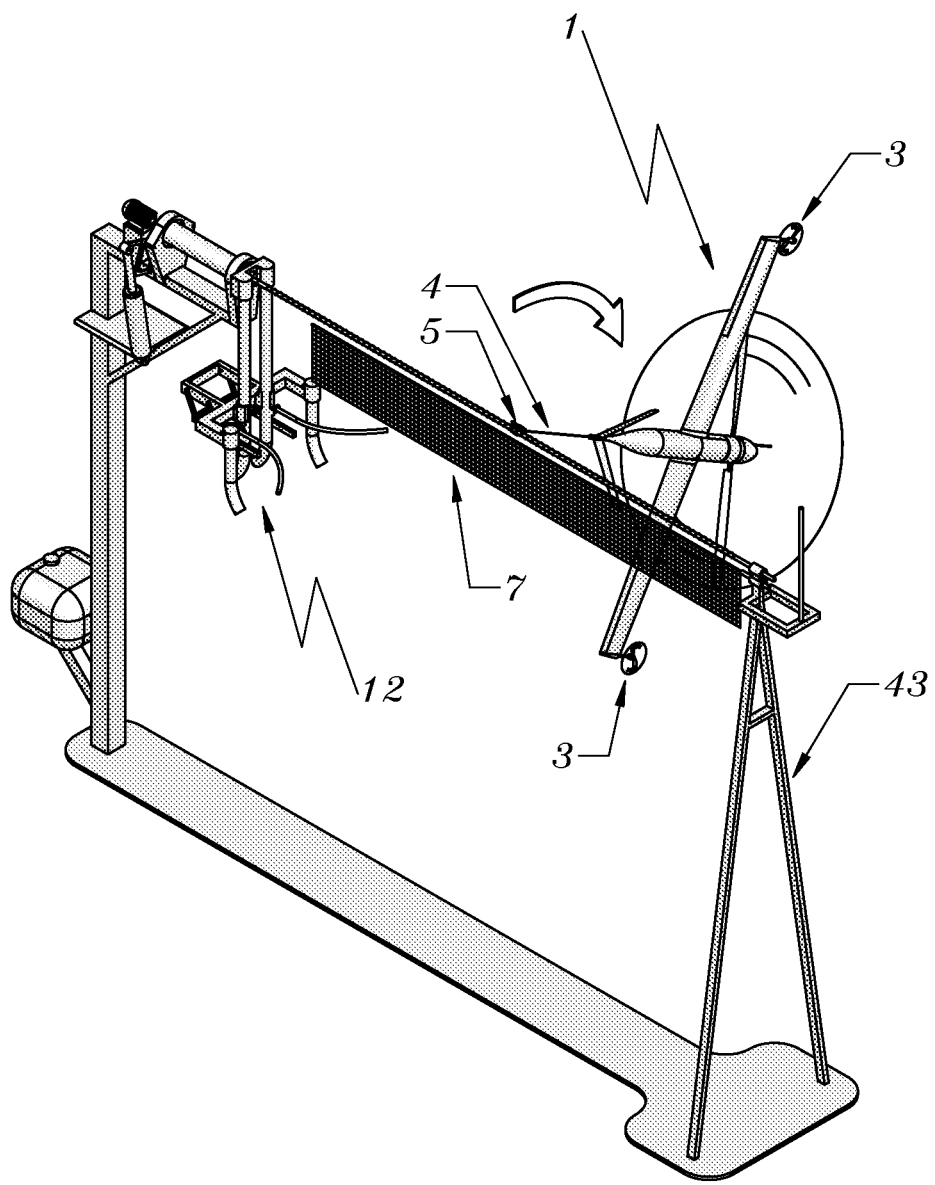

In most practical cases the tether will be attached to the aircraft below the aircraft mass centre. Hence, once attached to the horizontal guide, the aircraft can be maintained upright only by appropriate application of active control to counter inverted-pendulum instability. Control authority, however, may be insufficient to reject disturbances caused by wind gusts or base motion (as on a rocking ship). Sensitivity to such disturbances increases as tether length decreases. A tether attachment on the aircraft, as illustrated in FIG. 1, is therefore problematic if the aircraft is required to remain upright after capture. However this problem is turned into a virtue by having the aircraft swing inverted as shown in FIG. 1(c). In the inverted position, hanging from the guide, the aircraft can handle relatively large disturbances. The swing can be done immediately after capture, or later. For example, the aircraft may rotate after the tether is shortened while the aircraft remains upright. Inverting with a short tether has the advantage of minimizing the crossbar height necessary to clear underlying obstacles. Once inverted, the aircraft can reduce thrust while maintaining attitude-control authority.

The next step is to translate along the guide toward a docking carriage 12. If the guide has sufficiently low sliding friction, or if the hook has rollers or effective rolling elements, as illustrated in FIG. 3, then the aircraft can pull the tether along-guide by tilting its thrust axis. Alternatively, the guide can incorporate a mechanism for translating the tether. For example, the crossbar of FIG. 1 and FIG. 2 is wound with a screw thread 9 whose crests engage the hook. Spinning the crossbar, for example with a motor 10, thus draws the aircraft along the crossbar toward a docking carriage 12. The docking carriage is shown in detail in FIG. 4(a).

Figure 1D:
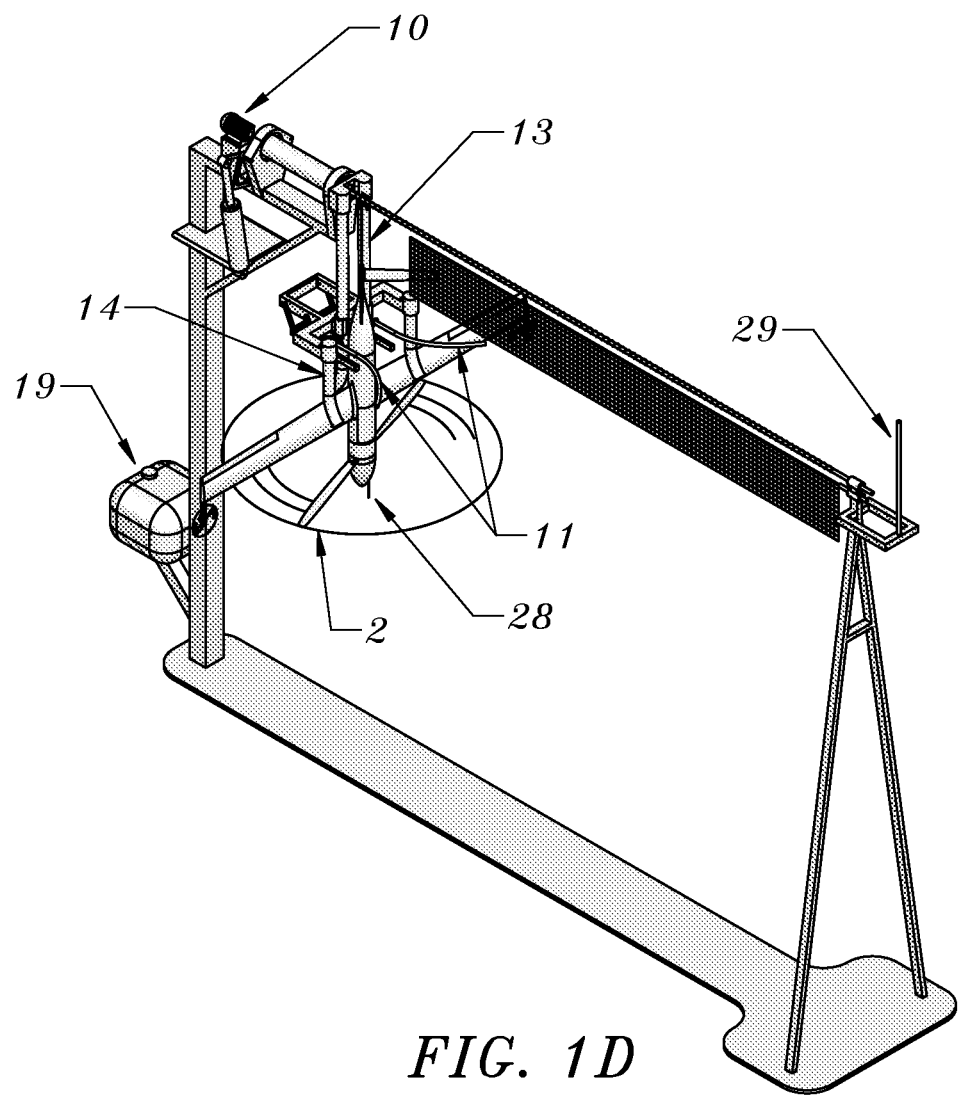
Figure 4B:
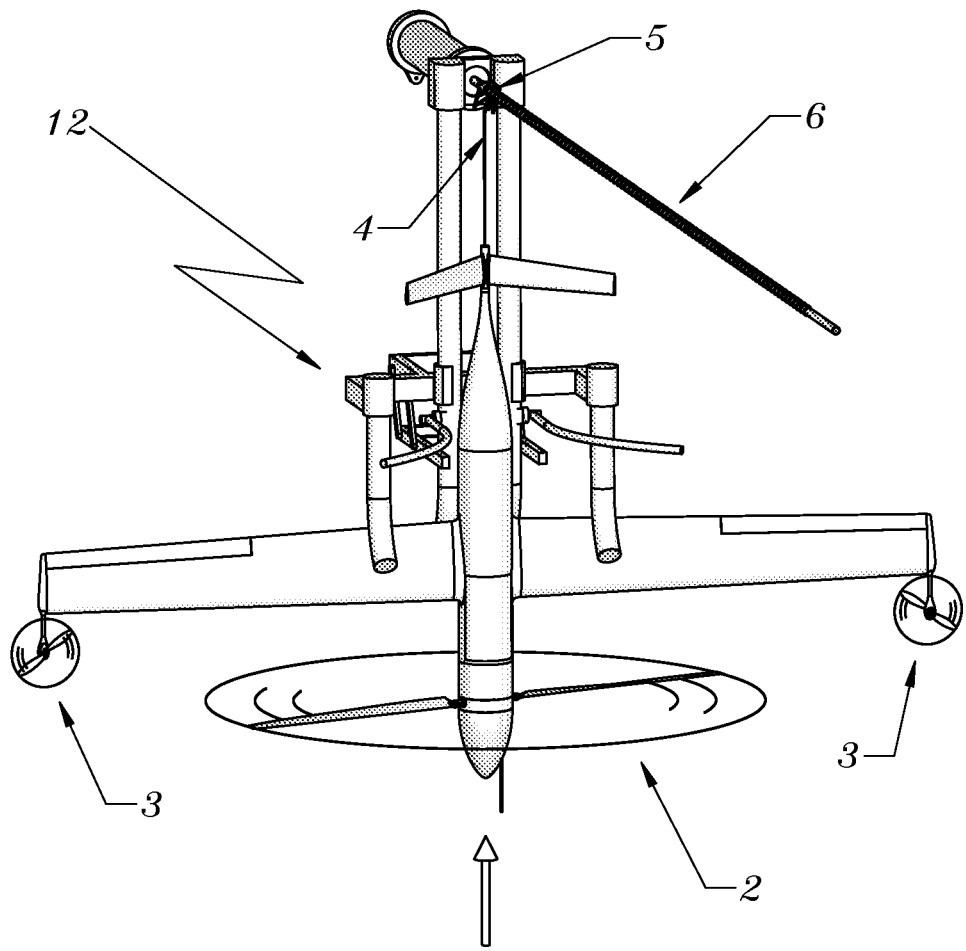

As the aircraft approaches the docking carriage, the aircraft can be guided into alignment by various constraining surfaces, including for example arms 11, longerons 13, and wing trailing-edge supports 14, as shown in FIG. 1(d) and FIG. 4(b). When the tether reaches an appropriate position along the crossbar, the aircraft can winch itself firmly and precisely into the docking carriage. The aircraft's powerplant may then be switched off.

In the embodiment of FIG. 1, the docking carriage includes a linkage 16, as shown in more detail in FIG. 5, whereby winching the aircraft into the carriage causes a fueling probe 17 to be inserted into a receptacle 18 on the aircraft. Connections for oil or electricity could be made similarly, or by a suitable mechanism actuated independently after docking is complete. The aircraft can be serviced through such connections at any time while in the docking carriage. For example, fuel may be pumped from a tank 19 on the base station through a supply line 42 into the aircraft. The aircraft or docking station could include appropriate sensors for measuring flow and quantity so that a specified amount of fuel could be automatically on- or off-loaded.

Figure 1E:
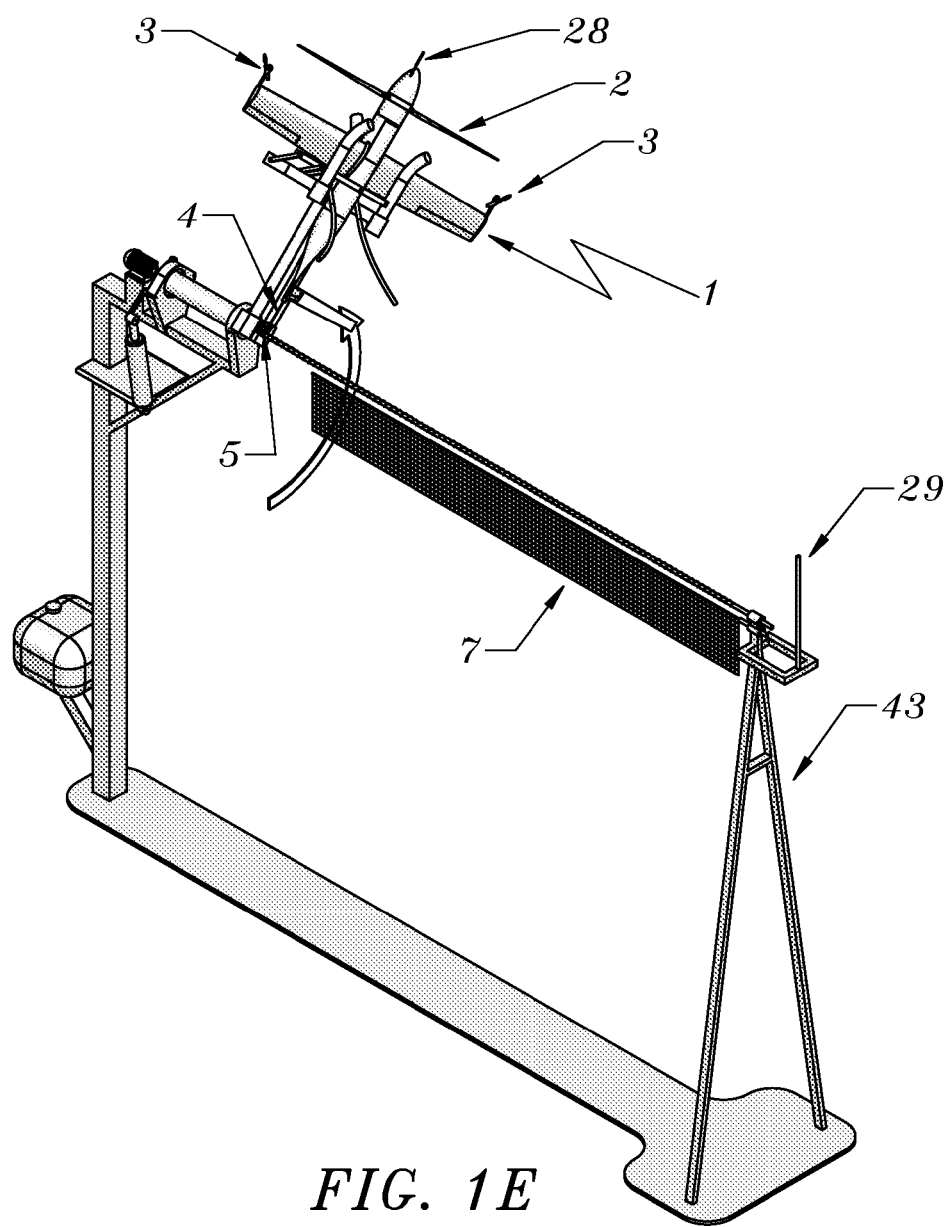
Figure 1F:
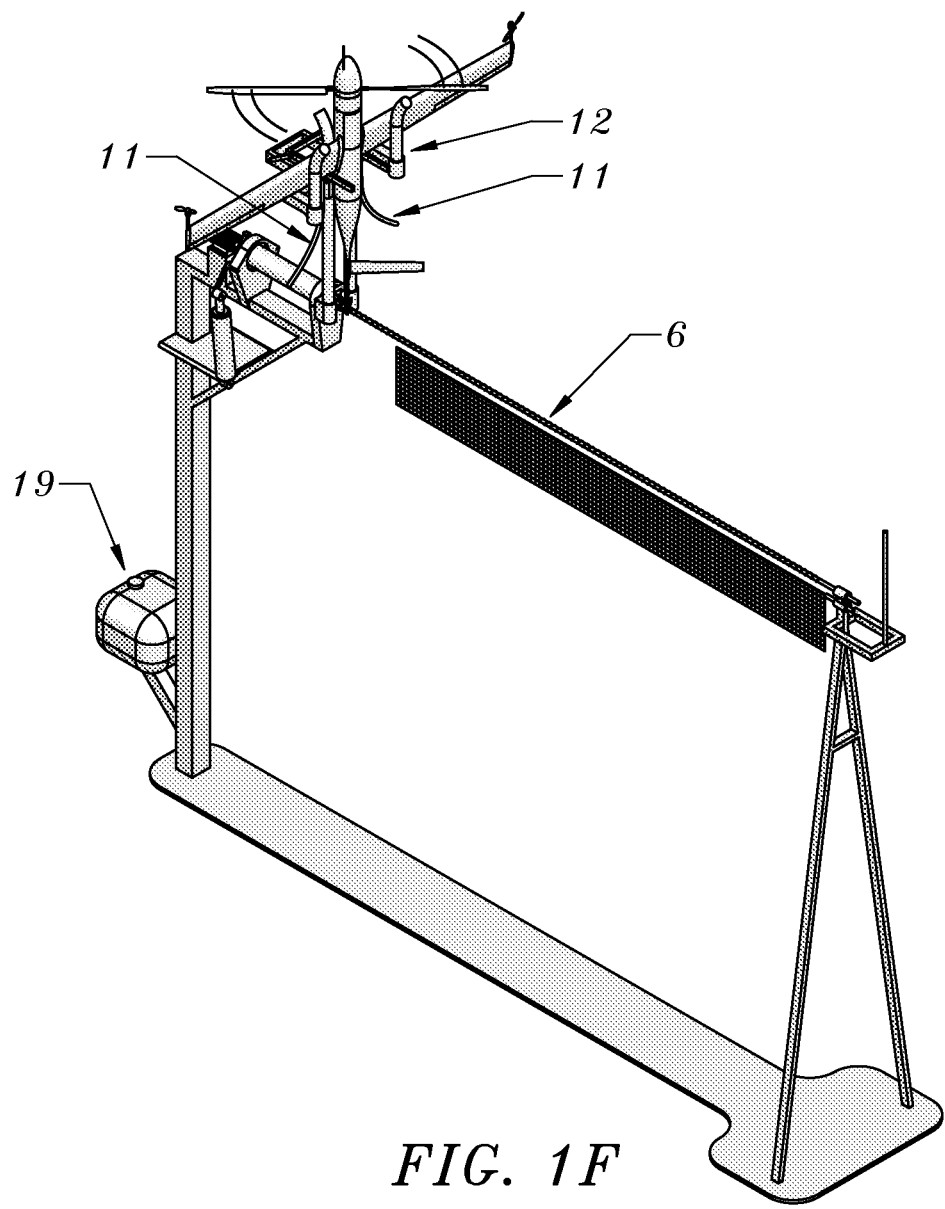
Figure 1G:
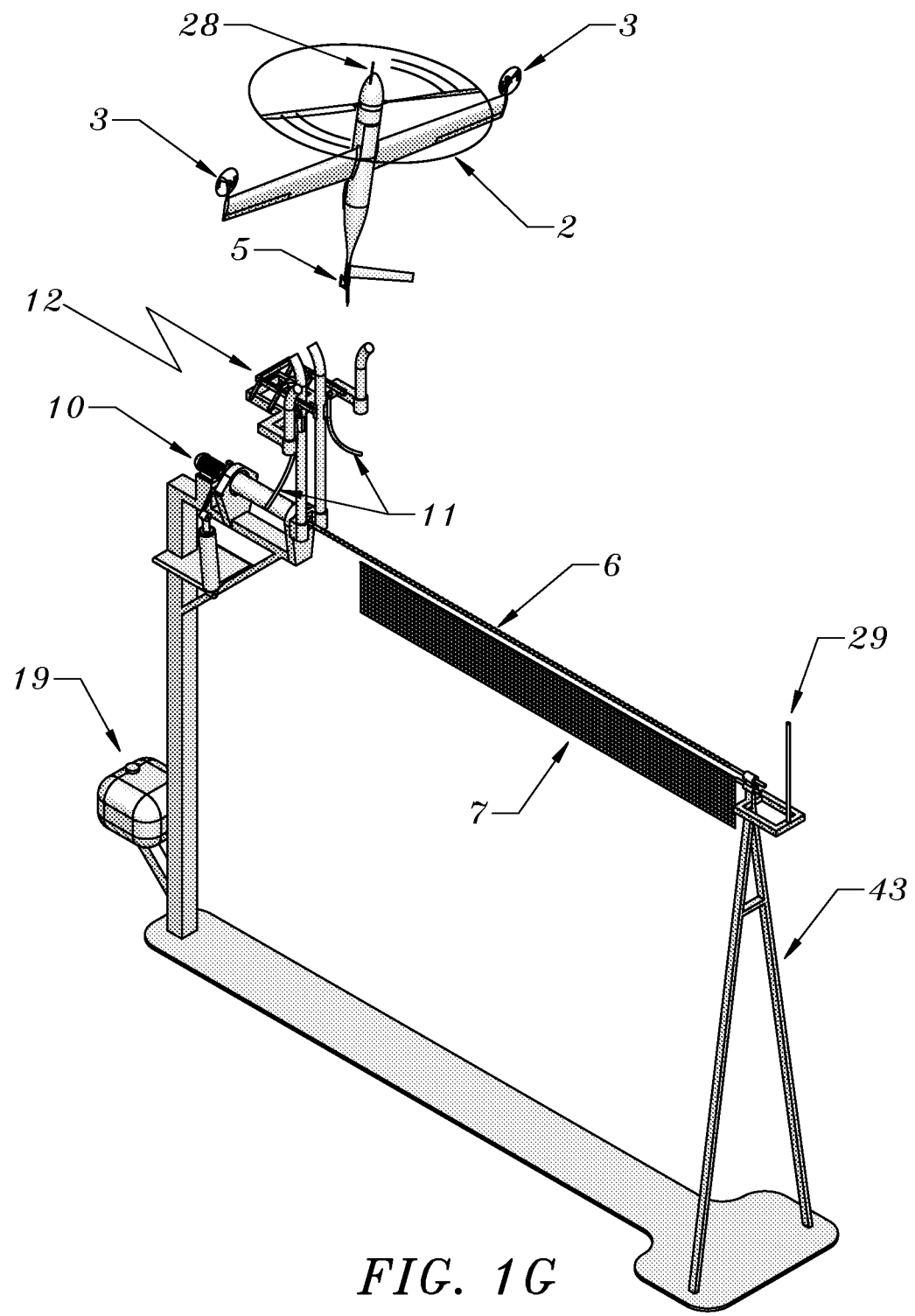
Figure 4C:
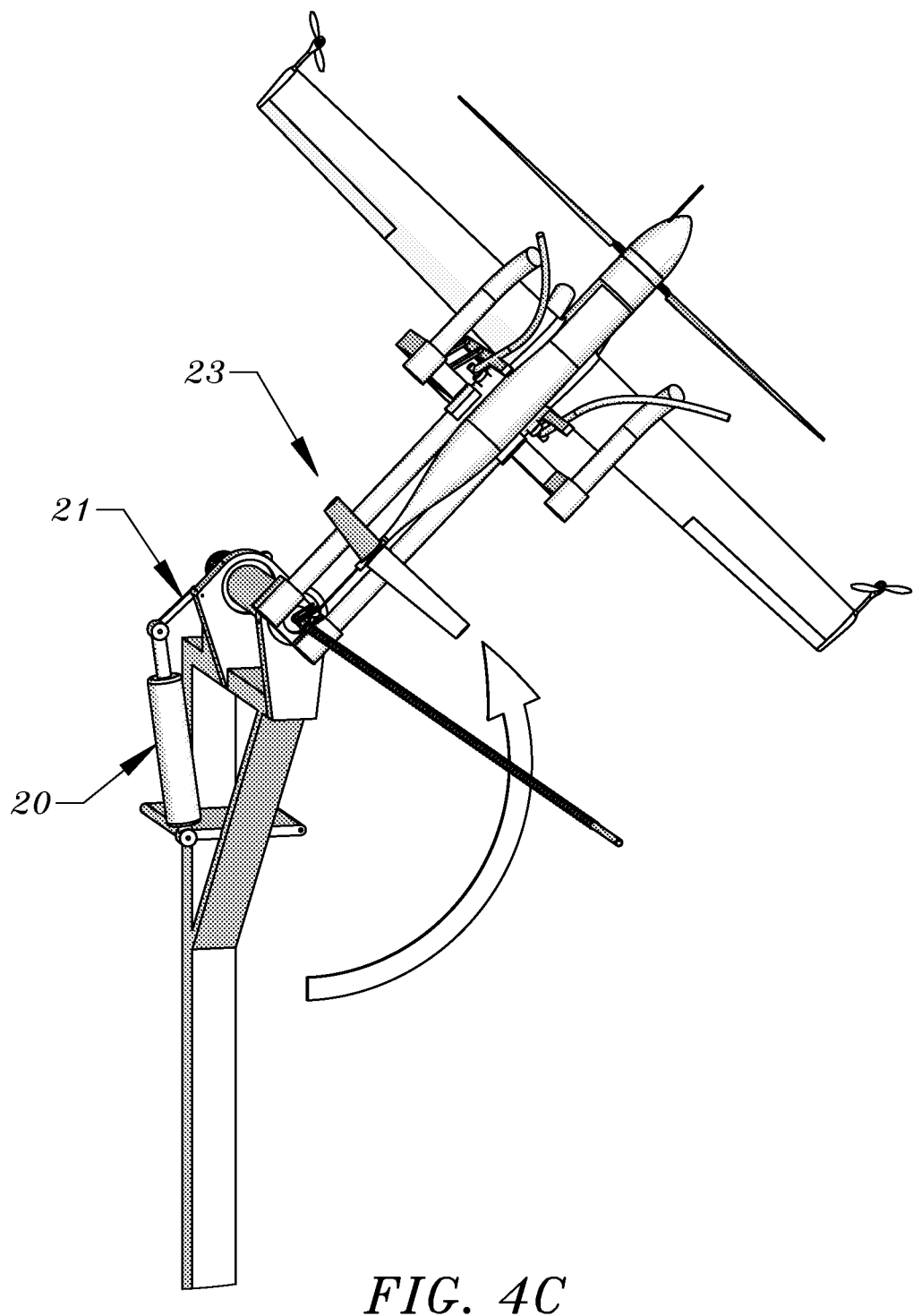

In preparation for launch of the aircraft, the docking carriage must be swung upright. In the embodiment of FIG. 1(e) and FIG. 4(c), this is done by a telescoping actuator 20 and linkage 21. As the carriage swings, the guide arms 11 rotate under gravity around hinges 22, thus clearing a path for the aircraft to launch without fouling the empennage 23. The aircraft meanwhile remains constrained by the longerons 13 and wing supports 14.

When convenient, the aircraft powerplant could be started by an onboard motor, or by an external motor coupled to the engine by a suitable linkage. Pre-launch checks could then be executed automatically.

Figure 6A:
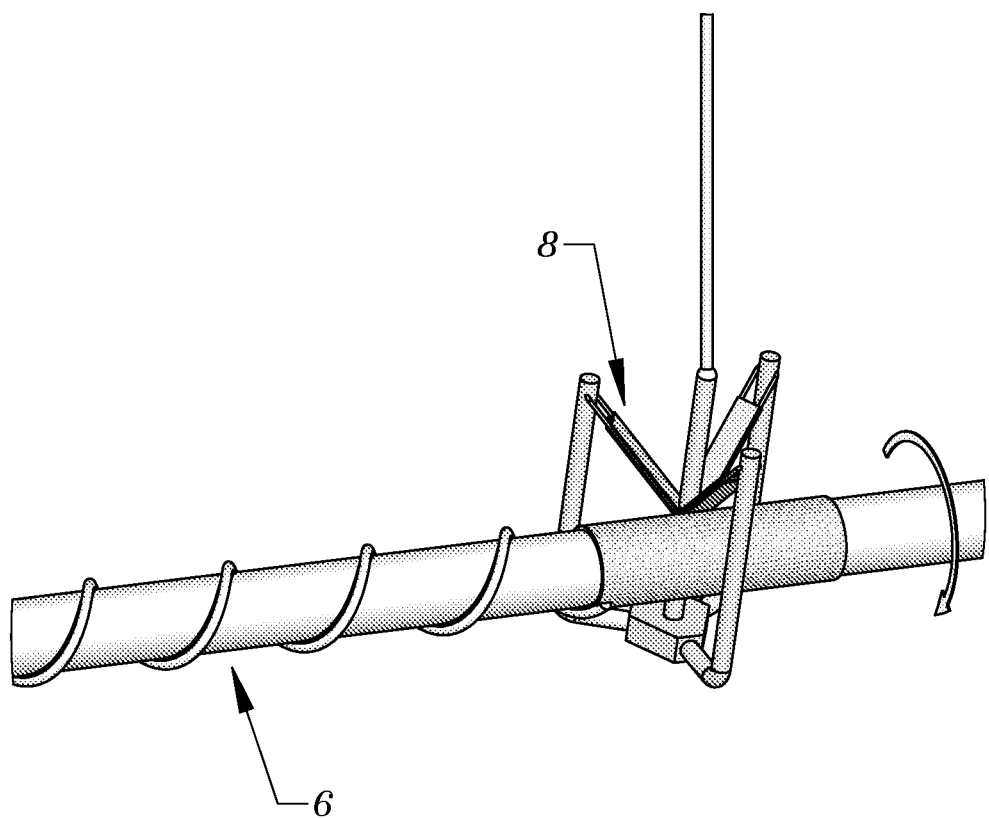
Figure 6B:
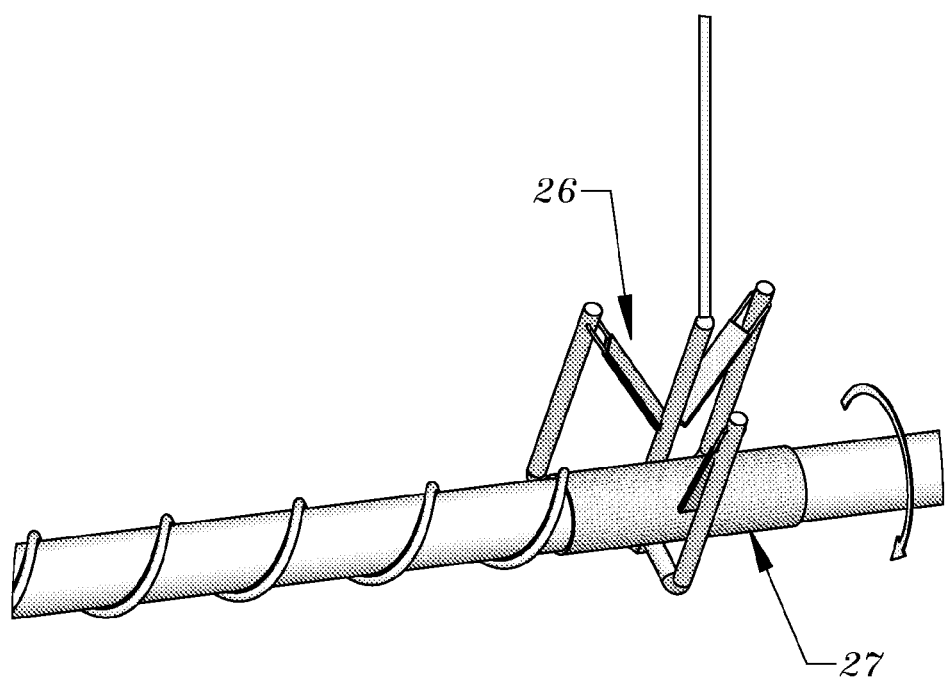
Figure 6C:
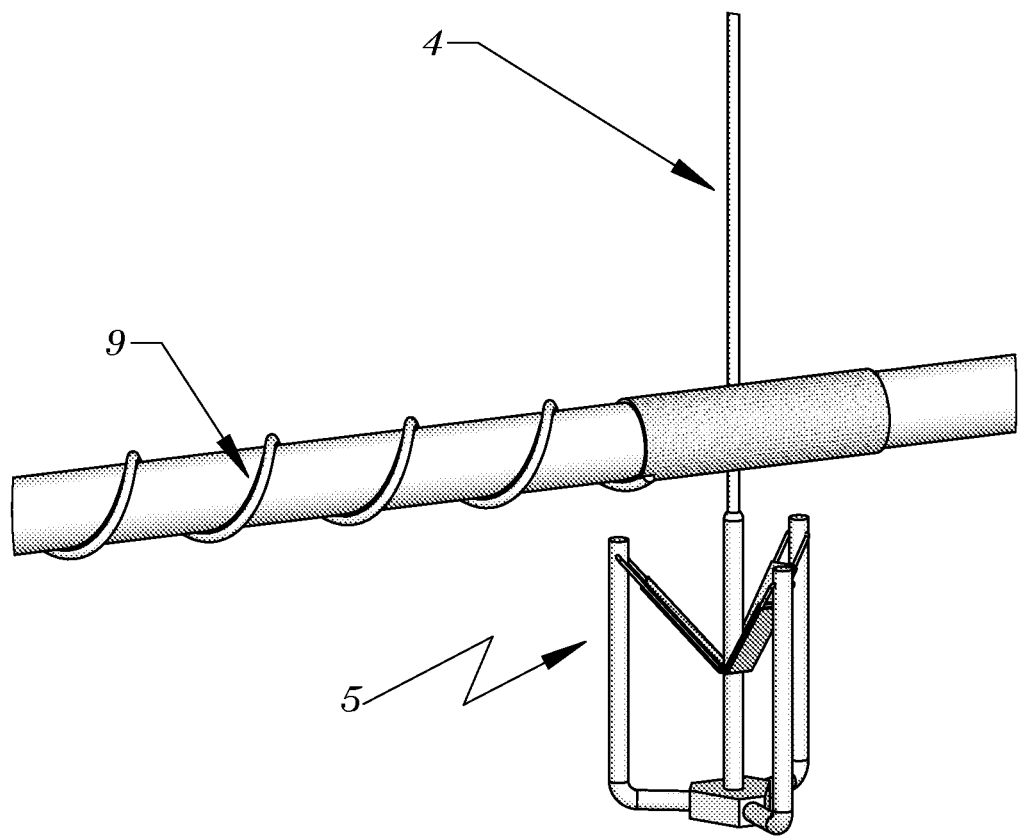

For launch, the hook 5 must be released from the guide 6. One method for hook release is shown in FIG. 6. First, the tether is extended so that a patch of Velcro or like material 26 on the hook's gate 8 comes into contact with a mating pad 27 wrapped around the crossbar 6, as shown in FIG. 6(a). Then the motor 10 slowly spins the crossbar 6. Meanwhile, the material 26 on the hook's gate 8 and the mating pad 27 remain in contact, and so in effect "unwrap" the gate from the crossbar, as shown in FIG. 6(b). Hence the hook drops away from the crossbar, and can be retracted into the aircraft as illustrated in FIG. 6(c).

The aircraft is then restrained only by gravity and the remaining carriage constraints. These could be configured to have some appropriate break-out force, so that the aircraft could exit into free flight only if it had some selected excess of thrust over weight. This would ensure that, upon pulling free of the docking carriage, the aircraft would accelerate briskly away from the base station and any nearby obstacles. The carriage 12 would then be swung to the inverted position in preparation for the next retrieval.

For automated operation, the aircraft and base station could each be equipped with satellite navigation or comparable equipment for measurement of relative position and velocity in three dimensions, using antennas on the aircraft 28 and on a reference point 29 near the docking carriage. Each could also have magnetic or inertial sensors for measurement of orientation, as well as appropriate mechanisms for computation, power supply, and communication.

Other illustrative embodiments are, shown in FIG. 7 through FIG. 10. The embodiment of FIG. 7 uses a tensioned cable 30 as the horizontal guide. This has the advantage of being light and easily packed for transport. The cable could be strung from the docking carriage to a support pole 31, or to a support-of-opportunity, such as a tree. The apparatus would be used as previously described, with the aircraft using thrust-tilt to pull a rolling-element hook, such as the one shown in FIG. 3, along the guide. For hook release the end of the cable could be fitted with a concentric cylindrical section 32, as shown in detail by FIG. 8. The hook would be pulled over the cylindrical section as the aircraft entered the docking carriage. The aircraft could then be released by the same sequence of steps as described with respect to FIG. 6, with the cylindrical section being spun by the motor 10.

FIG. 9 shows a further alternative embodiment in which the horizontal guide is formed by a chain 33 on a bar 34. One advantage of this embodiment is that the end-effector on the tether can be a simple bob 37 rather than the hook as in FIG. 2 or FIG. 3. For retrieval, the aircraft 1 deploys its tether 4 and draws it at low relative speed across the bar. The tether enters one of the apertures formed by teeth 35 attached to the links of the chain, and thence is channeled into the slot 36 between the teeth. The tether is then pulled through the slot until the bob meets the teeth. To complete capture, the aircraft must then swing inverted on the side of the bar opposite the ball. Note that this constraint does not apply with the embodiments of FIG. 1 and FIG. 7, in which capture is completed before inversion, and which allow the aircraft to invert on either, side of the bar.

After inversion, the chain is retracted by a motor 10 into a stowage area 38 until the ball reaches the vicinity of the docking carriage 12. The aircraft can then park as described above. The carriage is then swung upright, which must be done in the direction that reverses the aircraft inversion (again this condition does not apply with the embodiments of FIG. 1 and FIG. 7). The ball can then be released. This could be done as shown in FIG. 10, whereby further retraction of the chain 33 pulls the tether along a ramp 39, which ejects the ball 37 from the teeth 35. The aircraft can then retract the tether, and launch as described earlier.

It should be understood that various changes and modifications to the presently preferred embodiments described herein will, be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A flying object retrieval base apparatus for retrieving a flying object from substantially thrust-borne flight, said base apparatus including:
   (a) a guide;
   (b) at least one suspension support configured to suspend the guide such that the flying object in substantially thrust-borne flight can:
      (i) cause, by motion of the flying object relative to the guide, a tension element attached to the flying object to contact the guide, the tension element including an effector configured to engage the guide,
      (ii) cause the tension element to slide relative to the guide until the effector removably attaches to the guide, and
      (iii) after the effector removably attaches to the guide, rotate at least partially around the guide such that at least a portion of the flying object is positioned beneath the guide; and
   (c) a docking carriage mounted to the at least one suspension support configured to:
      (i) receive the flying object, and
      (ii) rotate at least partially around the guide to rotate the flying object such that a thrust line of the flying object is oriented to enable the flying object to exit from the docking carriage into free flight.

2. The base apparatus of claim 1, wherein the at least one suspension support is configured to suspend the guide in a principally horizontal orientation.

3. The base apparatus of claim 1, which includes a screen attached to the guide and configured to be suspended below the guide, wherein the screen is configured to damp pendulous oscillations of the tension element.

4. The base apparatus of claim 1, wherein the guide includes a crossbar.

5. The base apparatus of claim 1, wherein the guide includes a mating pad configured to removably attach to the effector to facilitate the effector disengaging from the guide.

6. The base apparatus of claim 1, wherein the guide includes at least one guiding surface configured to engage the effector and a motor configured to rotate the guide to facilitate a translation of the effector relative to the guide.

7. The base apparatus of claim 1, wherein the docking carriage includes at least one constraining surface configured to guide the flying object into the docking carriage.

8. The base apparatus of claim 7, wherein the at least one constraining surface includes at least one arm.

9. The base apparatus of claim 7, wherein the at least one constraining surface includes at least one longeron.

10. The base apparatus of claim 7, wherein the at least one constraining surface includes at least one wing trailing-edge support.

11. The base apparatus of claim 1, wherein the docking carriage includes a fueling probe insertable into a receptacle of the flying object and configured to add fuel to the flying object.

12. The base apparatus of claim 1, wherein the docking carriage includes a fueling probe insertable into a receptacle of the flying object and configured to remove fuel from the flying object.

13. The base apparatus of claim 1, wherein the docking carriage includes an oil connector connectable to the flying object and configured to add oil to the flying object.

14. The base apparatus of claim 1, wherein the docking carriage includes an oil connector connectable to the flying object and configured to remove oil from the flying object.

15. The base apparatus of claim 1, wherein the docking carriage includes an electricity connector connectable to the flying object and configured to add electricity to the flying object.

16. The base apparatus of claim 1, wherein the docking carriage includes an electricity connector connectable to the flying object and configured to remove electricity from the flying object.

17. The base apparatus of claim 1, which includes an actuator operatively coupled to a linkage, the linkage connecting the actuator to the docking carriage, the actuator and the linkage being configured to rotate the docking carriage at least partially around the guide such that the thrust line of the flying object is oriented at an angle greater than zero degrees and less than one hundred eighty degrees from horizontal.

18. The base apparatus of claim 1, which includes equipment configured to measure a three-dimensional position and a velocity of the flying object relative to the base apparatus.

19. The base apparatus of claim 1, which includes at least one sensor configured to measure an orientation of the flying object.

20. The base apparatus of claim 19, wherein the at least one sensor is a magnetic sensor.

21. The base apparatus of claim 19, wherein the at least one sensor is an inertial sensor.

22. The base apparatus of claim 1, wherein the guide includes a tensioned cable.

23. The base apparatus of claim 22, wherein a portion of the guide adjacent to the docking carriage includes a cylindrical section, the cylindrical section including a mating pad configured to removably attach to the effector to facilitate the effector disengaging from the guide.

24. The base apparatus of claim 1, wherein the guide includes a chain positioned on a bar, the chain including a plurality of links.

25. The base apparatus of claim 24, wherein the chain is translatable relative to the bar.

26. The base apparatus of claim 24, wherein one or more of the links are attached to a plurality of linear or curvilinear guiding surfaces, the plurality of guiding surfaces forming at least one horizontal or substantially horizontal aperture and at least one slot within the at least one aperture.

27. The base apparatus of claim 26, wherein the at least one slot is configured to accept the tension element and to not accept a bob mass included on the tension element.

28. The base apparatus of claim 24, which includes a chain stowage area.

29. The base apparatus of claim 24, wherein the guide includes a disengaging element configured to disengage the effector from the guide when the tension element contacts the disengaging element.

30. The base apparatus of claim 1, which is attached to a movable vehicle.

* * * * *